United States Patent
Au (10) Patent No.: US 7,330,991 B2
(45) Date of Patent: Feb. 12, 2008

(54) METHOD AND/OR APPARATUS FOR PAGING TO A DYNAMIC MEMORY ARRAY

(75) Inventor: Jonson C. Au, Milpitas, CA (US)

(73) Assignee: LSI Logic Corporation, Milpitas, CA (US)

( * ) Notice: Subject to any disclaimer, the term of this patent is extended or adjusted under 35 U.S.C. 154(b) by 477 days.

(21) Appl. No.: 10/733,751

(22) Filed: Dec. 11, 2003

(65) Prior Publication Data

US 2004/0230855 A1 Nov. 18, 2004

Related U.S. Application Data

(60) Provisional application No. 60/470,663, filed on May 15, 2003.

(51) Int. Cl.
*H04L 7/00* (2006.01)
*G06F 13/28* (2006.01)

(52) U.S. Cl. .......................... 713/400; 710/22

(58) Field of Classification Search ................. 713/400; 710/29, 22
See application file for complete search history.

(56) References Cited

U.S. PATENT DOCUMENTS

| | | | | |
|---|---|---|---|---|
| 4,615,017 A | * | 9/1986 | Finlay et al. ............... | 713/400 |
| 5,448,715 A | * | 9/1995 | Lelm et al. .................. | 713/600 |
| 6,076,170 A | * | 6/2000 | Dinh et al. .................. | 713/500 |
| 6,134,638 A | * | 10/2000 | Olarig et al. ............... | 711/167 |
| 6,327,667 B1 | * | 12/2001 | Hetherington et al. ...... | 713/500 |
| 6,366,989 B1 | * | 4/2002 | Keskar et al. .............. | 711/167 |
| 6,470,376 B1 | * | 10/2002 | Tanaka et al. .............. | 718/108 |
| 6,516,362 B1 | * | 2/2003 | Magro et al. ............... | 710/58 |
| 6,606,689 B1 | * | 8/2003 | Cheng et al. ................ | 711/137 |
| 6,941,416 B2 | * | 9/2005 | Dorst .......................... | 711/106 |
| 7,130,932 B1 | * | 10/2006 | Ghaffari ...................... | 710/22 |

OTHER PUBLICATIONS

Scott Mueller, Upgrading and Reparing PCs, Que, 13th edition, chapter 6, pp. 1-10.*
Micron Technology, Inc., Synchronous Dram, Mar. 2002, pp. 1-62.

* cited by examiner

*Primary Examiner*—Thomas Lee
*Assistant Examiner*—Ji H Bae
(74) *Attorney, Agent, or Firm*—Christopher P. Maiorana PC (57) ABSTRACT

An apparatus comprising a processor, an interface circuit and a memory. The processor may be configured to operate at a first data rate in response to a first clock signal. The interface circuit may be configured to (i) operate in response to the first clock signal, and (ii) convert data received from the processor over a system bus from the first data rate to a second data rate. The memory may be (i) coupled to the interface circuit and (ii) configured to present/receive data to/from the system bus at the second data rate.

21 Claims, 9 Drawing Sheets

METHOD AND/OR APPARATUS FOR PAGING TO A DYNAMIC MEMORY ARRAY

This application claims the benefit of U.S. Provisional Application No. 60/470,663, filed May 15, 2003 which is hereby incorporated by reference in its entirety.

FIELD OF THE INVENTION

The present invention relates to memories generally and, more particularly, to a method and/or apparatus for paging to a dynamic memory array.

BACKGROUND OF THE INVENTION

Conventional memory controllers typically first execute a terminate command to end a row access in progress followed by a precharge command to deactivate the row. Alternately, a precharge can end and close the bank altogether. Conventional controllers can also operate with a fixed burst length. A read or a write needs to be executed every so often to sustain the data burst. Conventional controllers execute more than one refresh and make a longer available continuous time for read/write accesses. Furthermore, in order to hide mandatory SDRAM overhead cycles (i.e., precharge, active, refresh) from the transferring master, a first-in-first-out (FIFO) buffer is typically used.

Conventional controllers use memory control logic to keep track of row activation status in each bank to streamline data burst transfers. Read or write commands are executed in a fixed data length basis if explicit termination is not used. At a minimum, opened banks with activated rows are due to be closed with a precharge.

More refresh cycles lead to a longer blackout time on the memory interface for data access. A FIFO with a large depth is needed to accommodate the larger amount of data incurred from the transferring master (which is unconcerned of the blackout time). Implementing a deeper FIFO causes a longer fill and drain time (and longer latency) at the start of a read and at the end of a write, respectively.

If the clock rate on the memory interface is not running at a sufficiently slow clock rate (i.e., being much higher than what is necessary) the memory interface could spend large portion of time waiting for new data or a new request from the transferring master. Each of the shortcomings outlined above can cause frequent command issuance from a memory controller to a SDRAM interface, high idle to payload data transaction time ratio, superfluous hardware logic, deep pipelining flip-flops, fast silicon process requirement, and/or high power consumption.

It would be desirable to implement a method and/or apparatus for paging to a dynamic memory array that takes advantage of the available bandwidth on the memory interface. Such a paging system may reduce unnecessary resource consumption.

SUMMARY OF THE INVENTION

The present invention concerns an apparatus comprising a processor, an interface circuit and a memory. The processor may be configured to operate at a first data rate in response to a first clock signal. The interface circuit may be configured to (i) operate in response to the first clock signal; and (ii) convert data received from the processor over a system bus from the first data rate to a second data rate. The memory may be (i) coupled to the interface circuit and (ii) configured to present/receive data to/from the system bus at the second data rate.

The objects, features and advantages of the present invention include providing a method and/or apparatus for paging to a dynamic memory array that may (i) avoid the relatively complex control flow of conventional memory controllers, (ii) provide a scalable implementation and/or (iii) reduce unnecessary resource consumption (e.g., superfluous hardware logic, more pipelining flip-flops, faster silicon process, and/or higher power).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention relates to a method and/or apparatus implemented in a digital logic device for accessing a synchronous dynamic memory array (SDRAM). SDRAMs are typically implemented as discrete semiconductor component(s) used at the system level. The present invention may provide a method to correlate data throughput generated from a transferring master with the memory buffer in a given system environment. The present invention generally avoids the relatively complex control flow of conventional memory controllers. The present invention is generally scalable with variables to suit different systems.

More specifically, given a predictable maximum throughput for a particular implementation, the present invention may be used to maximize the throughput to bandwidth ratio on a SDRAM interface. A SDRAM controller using such a scalable implementation uses a low amount of semiconductor area (compared with conventional approaches) for control logic implementation and may use a relatively slow clock rate (compared with conventional approaches). Such an implementation may provide bandwidth sufficient to satisfy the maximum data throughput of such a system and may minimize idle time on the memory interface. The logic device may be a field programmable gate array, or a mask programmable array or a cell-based application specific integrated circuit (ASIC) along with other integrated functionalities.

The present invention may be efficient in terms of hardware resource, semiconductor process technology and power concerns. While data throughput is considered a typical design criteria, the implementation of the present invention to satisfy throughput becomes more valuable when throughput demands increase.

The present invention may allow data block transfers at contiguous addresses to the SDRAM to be made seamless. Being aware of the relationship among data structure, data throughput and available memory architecture on the system level, a data stream may be buffered in a more efficient fashion, without making superfluous accesses to the memory. Such an implementation simplifies hardware logic of the controller by allowing operation at the slowest, yet adequate, clock rate. Having a resource efficient implementation in a logic device, such a controller, may hide memory access latency and forsake hardware flow control needed by the transferring master. A controller running at relatively slow speed and reduced power consumption allows for relaxed semiconductor process criteria and therefore normally results in lower total cost.

Figure 1:
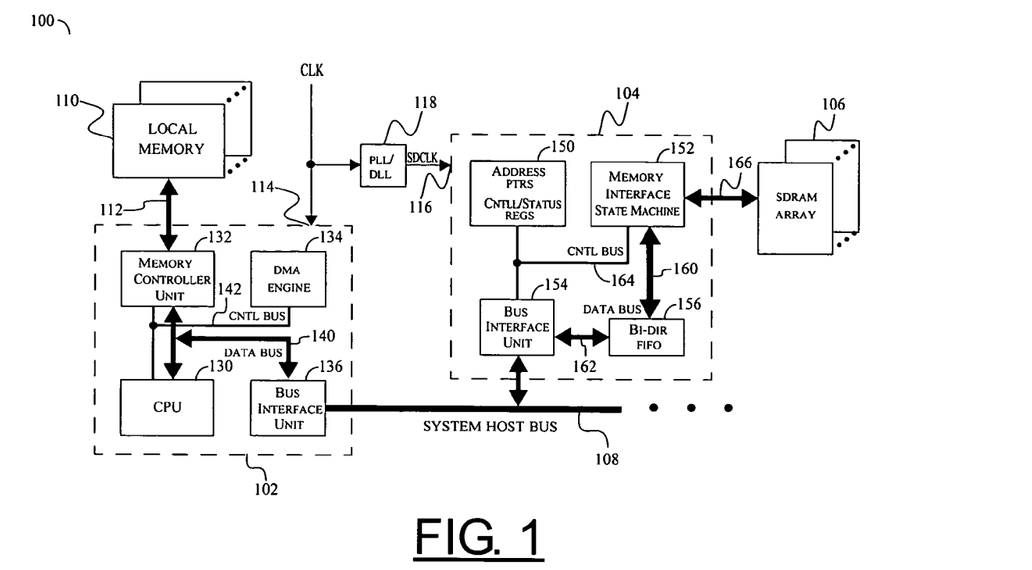
FIG. 1 is a block diagram illustrating a preferred embodiment of the present invention.

Referring to FIG. 1, a system 100 is shown. The system 100 generally comprises a processor block (or circuit) 102, an interface block (or circuit) 104 and a memory block (or circuit) 106. A bus 108 may connect the processor 102 with the interface 104. The bus 108 may be implemented as a system host bus. A local memory 110 may be connected to the processor 102 through a bus 112. The bus 112 may be a bi-directional bus. The processor 102 may have an input 114 that may receive a system clock signal (e.g., CLK). The interface 104 may have an input 116 that may receive a clock signal (e.g., SDCLK), through a circuit 118. The output of the circuit 118 may be considered a second clock signal SDCLK where the clock signal CLK may be considered a first clock signal. The circuit 118 may be implemented as a phase locked loop (PLL)/digitally locked loop (DLL) circuit.

The processor block 102 generally comprises a block (or circuit) 130, a block (or circuit) 132, a block (or circuit) 134 and a block (or circuit) 136. The circuit 130 may be implemented as a central processing unit (CPU). The circuit 132 may be implemented as a memory controller unit. The circuit 134 may be implemented as a direct memory access (DMA) engine. The circuit 136 may be implemented as a bus interface unit. The CPU 130 and the DMA engine 134 may be collectively referred to as the transferring master. In one example, the processor block 102 may be implemented as an integrated processor. A data bus 140 may connect the CPU 130, the circuit 132 and the circuit 136. The data bus 140 may be implemented as a bi-directional bus. A control bus 142 may connect the CPU 130, the circuit 132 and the DMA circuit 134. The control bus 142 may be implemented as a bi-directional bus. The circuit 136 may be connected to the bus 108.

The interface 104 generally comprises a block (or circuit) 150, a block (or circuit) 152, a block (or circuit) 154 and a block (or circuit) 156. The circuit 150 may store address pointers in one or more control and/or status registers. The circuit 152 may be implemented as a memory interface state machine (to be described in more detail in connection with FIG. 2). The circuit 154 may be implemented as a bus interface unit. The circuit 156 may be implemented as a memory. In particular, the circuit 156 may be implemented as a bidirectional first in-first out (FIFO) memory. The interface 104 may be implemented with a variety of technologies (e.g., mask/field programmable logic devices). A data bus 160 may connect the memory interface state machine 152 with the FIFO 156. A data bus 162 may connect the memory 156 with the bus interface unit 154. A control bus 164 may connect the circuit 150, the circuit 152 and the circuit 154. A bus 166 may connect the circuit 152 with the memory 106. The data bus 160, the data bus 162, the bontrol bus 164 and the bus 166 may be implemented as bi-directional busses.

Figure 2:
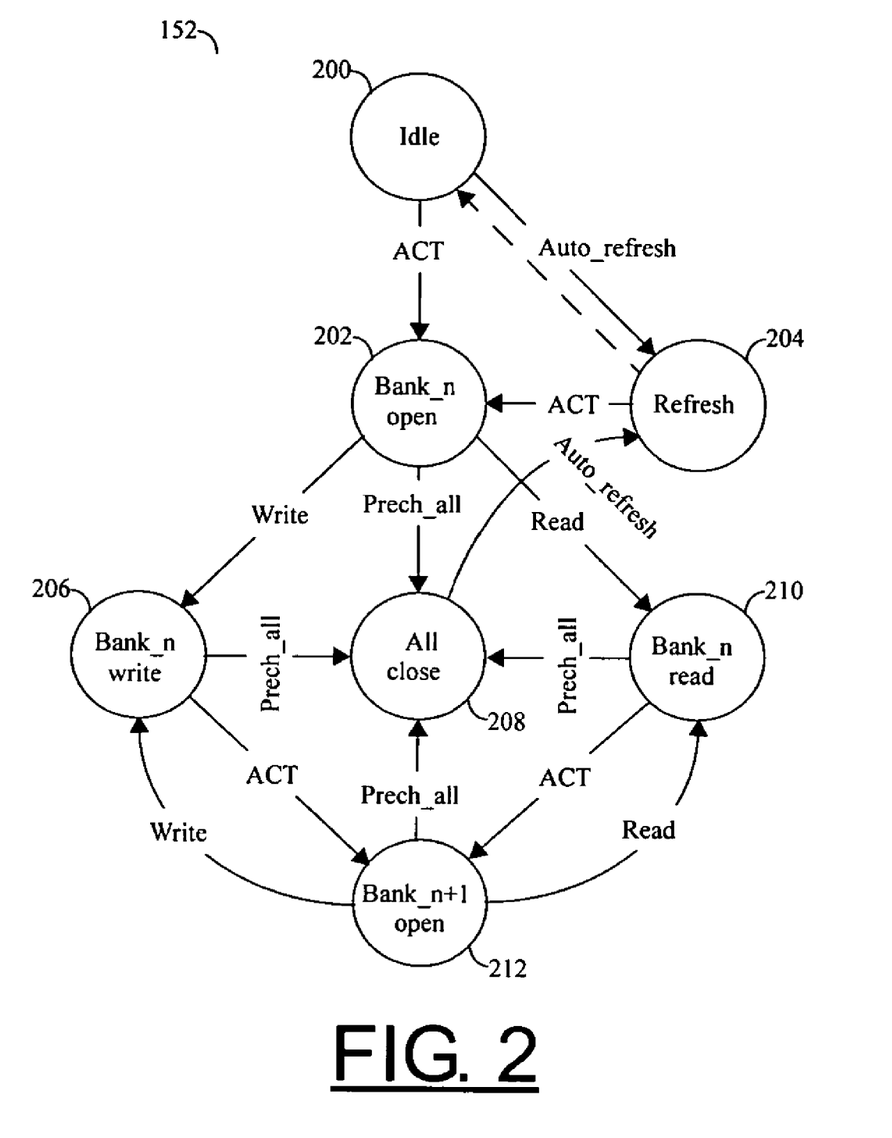
FIG. 2 is a diagram of a command sequence issued by a memory interface state machine in accordance with a preferred embodiment of the present invention.

Referring to FIG. 2, a detailed diagram of the memory interface state machine 152 is shown. The state machine 152 generally comprises a state 200, a state 202, a state 204, a state 206, a state 208, a state 210 and a state 212. The state 200 may be an idle state. The state 202 may be a bank_n open state. The state 204 may be a refresh state. The state 206 may be a bank_n write state. The state 208 may be an all close state. The state 210 may be a bank_n read state. The state 212 may be an increment state. Moving from the state 212 to the state 206 may initiate a write. The state 212 may initiate a bank_n being updated with bank_n+1. The bank_n+1 advances to bank_n+2. The state 208 is reached at most (total number of banks-1) times between two states 208.

Figure 3:
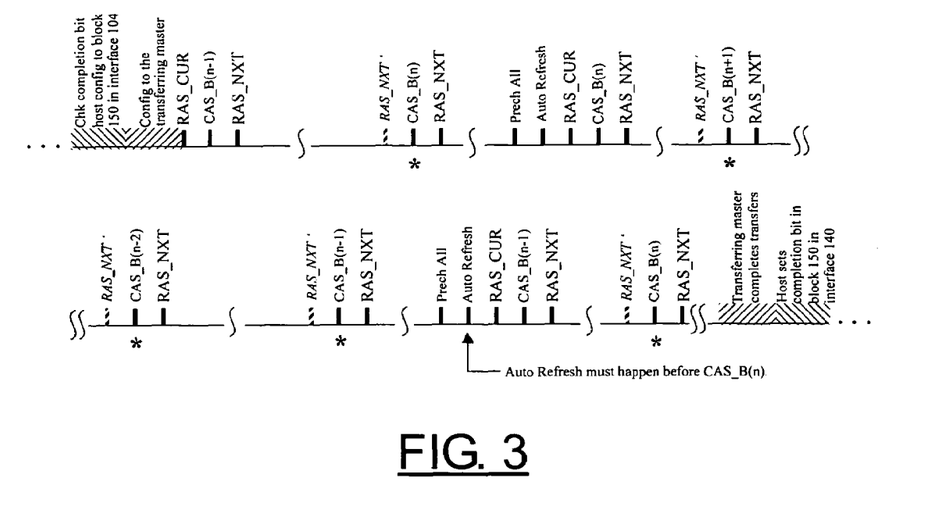
FIG. 3 is a diagram illustrating SDRAM activities timeline within a transfer session.

Referring to FIG. 3, a diagram illustrating SDRAM activities within a transfer session is shown. RAS_CUR represents a row access to an address specified in pointer CURRENT_BANK_ROW. RAS_NXT represents a row access to an address specified in the pointer NEXT_BANK_ROW. At *, the pointer CURRENT_BANK_ROW is updated with the pointer NEXT_BANK_ROW. The pointer NEXT_BANK_ROW advances to new row in the next bank. CAS_B(n) represents a column access to bank n, where n ranges from 0 to total number of banks-1 (0 . . . TOTAL-NUMBANK-1) n is considered wrappable in either direction on the bank number sequence 0, 1, 2, . . . , TOTALNUM-BANK-1. For example, if TOTALNUMBANK equals 8 while n equals 3, then B(n-4) would refer to B7 and B(n+6) would refer to B1.

Figure 4:
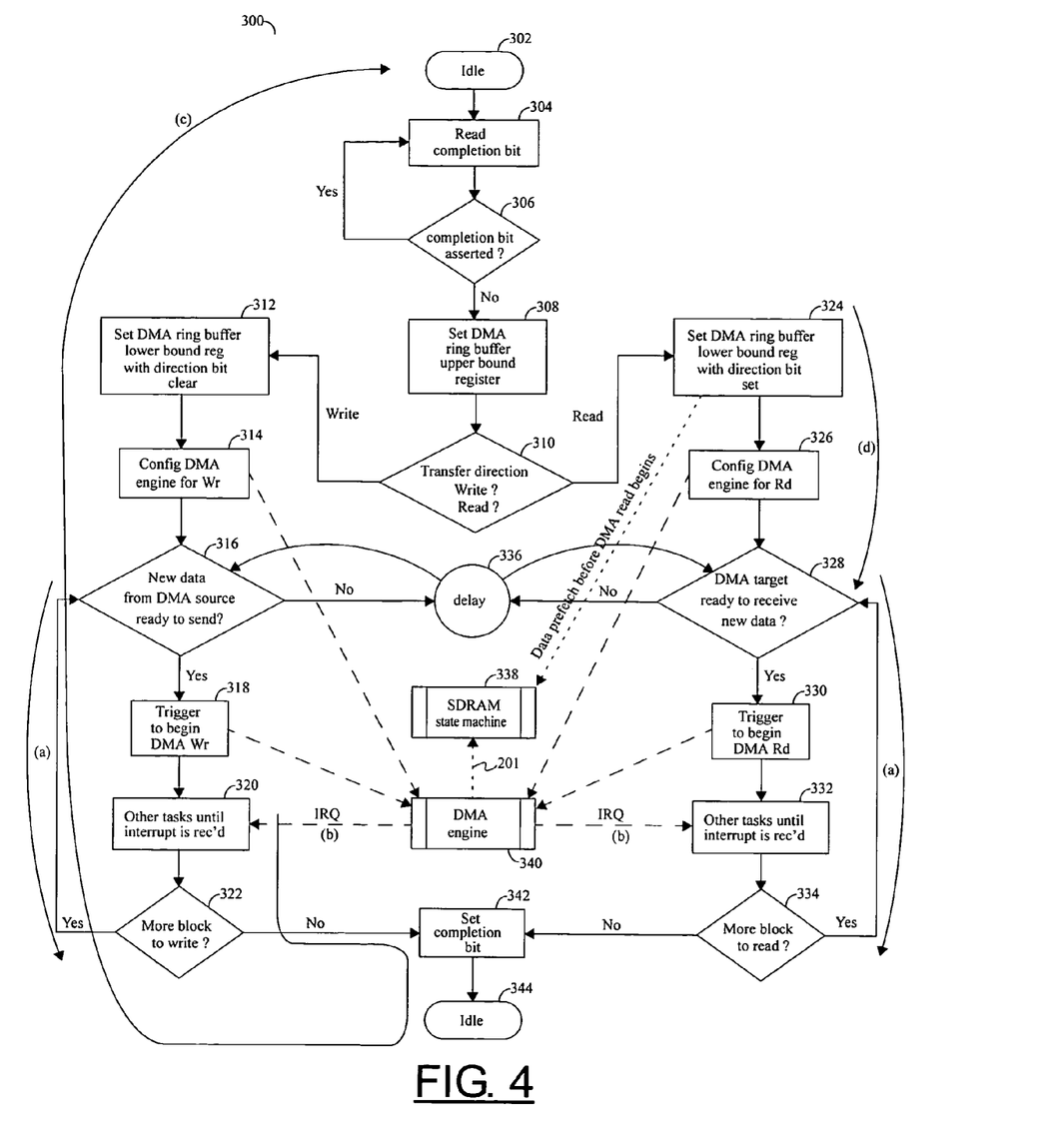
FIG. 4 is a diagram illustrating host activities for a DMA transfer session.

Referring to FIG. 4, a diagram of a process 300 illustrating host activities for a DMA transfer session is shown. The relationship of the DMA engine 134 and the state machine 152 to the CPU 130 is shown in FIG. 4. Sections 4(a)-4(d) illustrate various operations within a transfer session. The process 300 generally comprises a state 302, a state 304, a decision state 306, a state 308, a decision state 310, a state 312, a state 314, a decision state 316, a state 318, a state 320, a decision state 322, a state 324, a state 326, a decision state 328, a state 330, a state 332, a decision state 334, a state 336, a state 338, a state 340, a state 342 and a state 344. The state 338 is normally implemented as a hardware block (e.g., block 152). The state 340 is also normally implemented as a hardware block (e.g., the block 134).

The state 304 generally reads in the completion bit. The state 306 determines if the completion bit is asserted. If so, the method 300 moves to the state 304, if not, the method 300 moves to the state 308 and sets a DMA ring buffer upper bound register. Next, the state 310 determines whether the transfer of direction is a read or a write. If the transfer direction is a read, the method 300 moves to the state 324. If the transfer direction is a write, the method 300 moves to the state 312. The state 312 sets the DMA ring buffer lower bound register with a direction bit "clear". Next, the state 314 configures the DMA engine for a write. Next, the state 316 determines whether new data from the DMA source is ready to send. If so, the method 300 moves to the state 318. If not, the method moves to the state 336, which implements a delay. The state 318 begins a DMA write. The state 320 processes other tasks until an interrupt (e.g., IRQ) is received. Next, the state 322 determines if there are more blocks to write. If so, the method 300 moves back to the decision state 316. If not, the method moves to the state 342. The state 342 sets a completion bit and then moves to the idle state 344.

If the state 310 determines that the transfer direction is a read, the method 300 moves to the state 324. The state 324 sets the DMA ring buffer lower bound register with a direction bit to "set". Next, the method moves to the state 326 which configures the DMA engine 340 for a read. Next, the state 328 determines whether a DMA target is ready to receive new data. If so, the method 300 moves to the state 330. If not, the method 300 moves to the delay state 336. In the state 330, the method 300 begins a DMA read. Next, the state 332 implements other tasks until an interrupt IRQ is received. Next, the state 334 determines whether there are additional blocks to read. If so, the method 300 moves back to the state 328. If not, the method 300 moves to a state 342 and to the idle state 344.

The section 4(a) may contain several blocks of transfers. The section 4(a) generally includes the state 316, the state 318, the state 320, the state 322, the state 328, the state 330, the state 332 and the state 334. Upon finishing each block, the DMA engine 136 may generate an interrupt IRQ to the CPU 130. Generating the interrupt IRQ allows the CPU 130 know about the completion proactively. Otherwise, the DMA engine 134 may do nothing but let the CPU 130 passively poll on.

The section 4(b) normally allows time for the CPU 130 to react to an interrupt IRQ because the CPU 130 needs to switch from other tasks in progress. The interrupt IRQ is generated from the DMA engine 134 only when a block of transfer is finished. Having received the interrupt IRQ, the CPU 130 makes a decision whether to make another block of transfer.

The section 4(c) illustrates a write direction. The steps of 4(c) allow time while the FIFO 156 is being drained to the SDRAM 106. The section 4(c) generally includes the state 320, the state 322, the state 342, the idle state 344 and the idle state 302. By the time the completion bit is read for the first time before the next session is kicked off, the completion bit is already clear. The "No" branch may be entered right away to commence a new session. The section 4(c) allows concurrent activities, so the write latency of the FIFO 156 is hidden.

The section 4(d) illustrates operations in a read direction. The FIFO 156 starts to get filled from the SDRAM 106 once the direction bit is set. It takes some time to configure the DMA engine 134, so by the time DMA target is ready to receive new data, the FIFO 156 is filled and ready to supply data right away. The section 4(d) allows concurrent activities so the read latency of the FIFO 156 is hidden.

Figure 5:
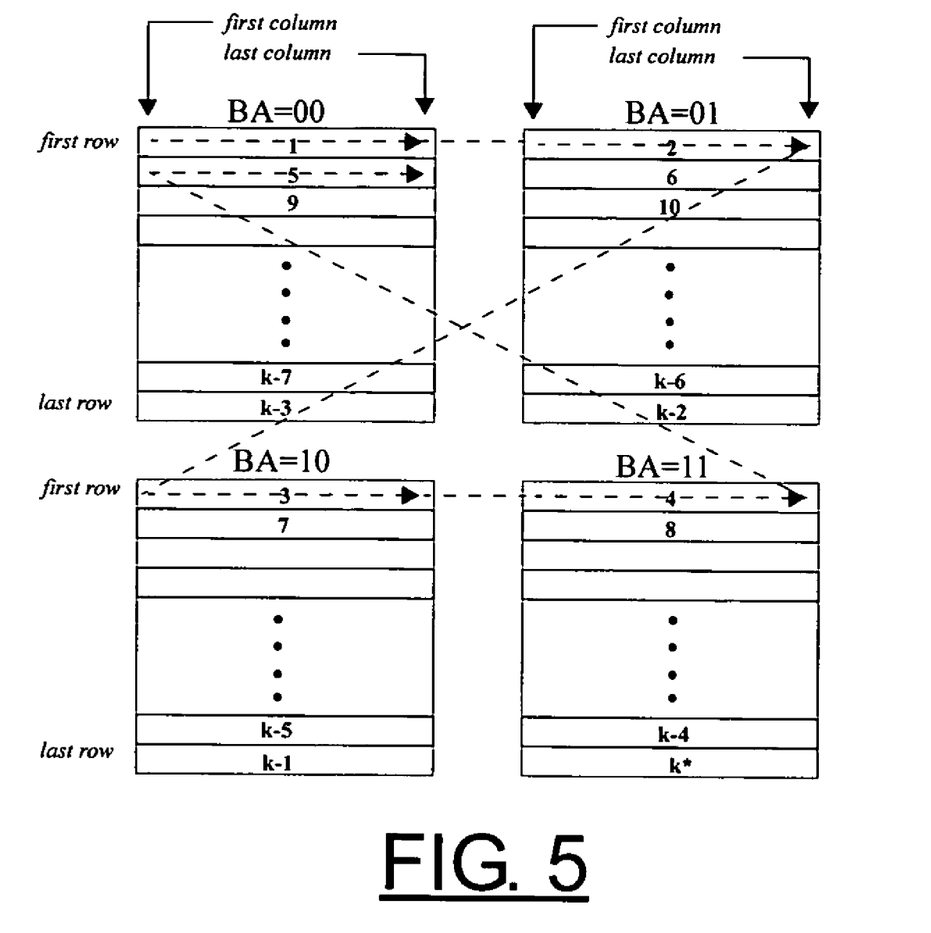
FIG. 5 is a diagram illustrating a SDRAM addressing sequence.

Referring to FIG. 5, a diagram illustrating a SDRAM addressing sequence is shown. A total of four banks are used in this example, with BA indicating a bank number. The numbers indicate row interleave sequence among all banks. The dashed arrows indicate a column access sequence within a row. The references in italics indicate cell address within a corresponding bank. The variable k is equal to the total number of rows in all of the banks.

The bus interface unit 136 normally has an average data rate no greater than the average data rate of the memory interface state machine 152 (e.g., an average over one SDRAM refresh period for one row). Furthermore, the time needed to finish accesses to any consecutive rows (e.g., TOTALNUMBANK-1) is normally no less than refresh period minus refresh overhead. The rate of the clock signal CLK needed to accomplish a certain data rate on the bus interface unit 136 connected the bus 108 is often not a flexible choice in the system level. Choosing such a rate may depend on (i) the transferring master (often a DMA machine embedded in a microprocessor host) and/or (ii) the given application (implied by software implementation for the host). Selecting a clock rate for the interface 104 to run the SDRAM memory array 106 is more easily implemented. The frequency of the interface 104 may only need to be slightly higher than the data rate of the transferring master to cover the time loss due to periodical refresh.

The ratio of SDRAM clock (where the SDRAM is able to sustain one data word on each clock) to the data rate of the host CPU may be defined as:

$$1/(REFHPRD-REFHOVHD):1/(REFHPRD)$$

where REFHPRD is the refresh period (e.g., one-page-at-a-time) row refresh cycle, typically 64 ms, divided by number of rows per bank and REFHOVHD is the refresh overhead access blackout time.

Figure 6:
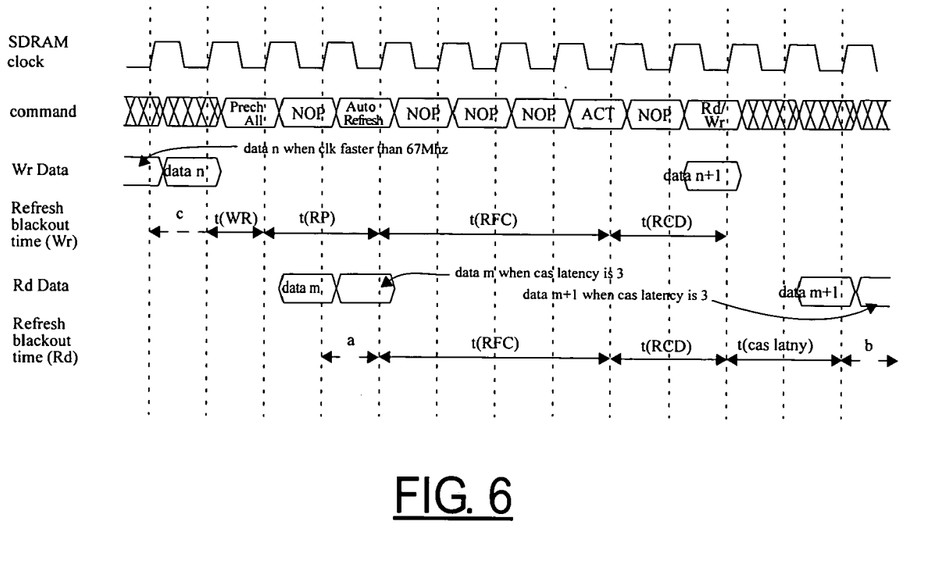
FIG. 6 is a diagram illustrating refresh overhead blackout time.

FIG. 6 illustrates the time REFHOVHD, which is normally the total of (i) refresh time t(RFC) (e.g., typically 4 SDRAM clock cycles), (ii) bank activate time for current bank t(RCD) (e.g., typically 2 SDRAM clock cycles), (iii) for write only, write recovery time t(WR) (e.g., typically 1 SDRAM clock cycles), (iv) for write only, precharge time t(RP) (e.g., typically 2 SDRAM clock cycles), (v) for read only, the combined SDRAM cas latency and precharge time t(cas latny)+(a or b) (e.g., typically 3 SDRAM clock cycles). The typical clock cycles mentioned are based, but not limited to, an operating speed of 54 Mhz.

In order to make the transfers seamless to the host CPU 130 (and thus no need for hardware flow control signal), the FIFO 156 is typically located on the data channel, separating the transferring master in the circuit 102 from the SDRAM 106. One or more control signals (e.g., WAIT# or DTACK#) may be stored in the FIFO 156. An SDRAM write cycle is normally triggered whenever there is new data in the FIFO 156. An SDRAM read cycle is normally triggered whenever there is space available in the FIFO 156. The FIFO 156 normally becomes (i) empty for write or (ii) full for read by the time the next refresh takes place, providing a seamlessness transfer. The size of the FIFO 156 depends on (i) the length of access blackout time for the refresh overhead and (ii) the data rate driven by the host. An integer round-up may be calculated as the data rate * REFHOVHD. The data rate may be equal to 40 mega-words per second. REFHOVHD is the refresh blackout time caused by a refresh. So, 185 nano-seconds (0.000000185 second) would equal 40e6 (words/second) 185e-9 (second), or 7.4 words. An integer round-up (or the ceiling function) of 7.4 would be 8.

Figure 7:
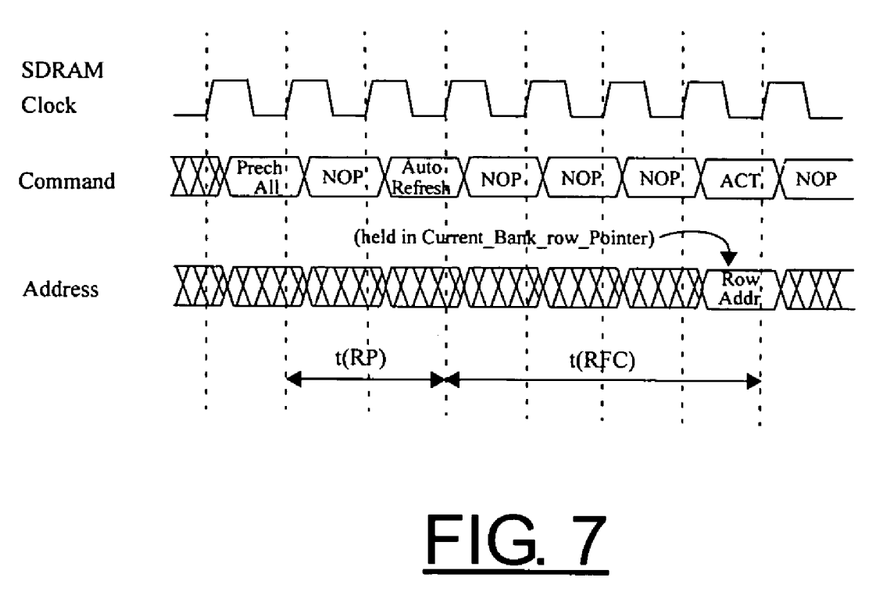
FIG. 7 is a diagram illustrating the timing of a row access using a current bank row pointer.
Figure 8:
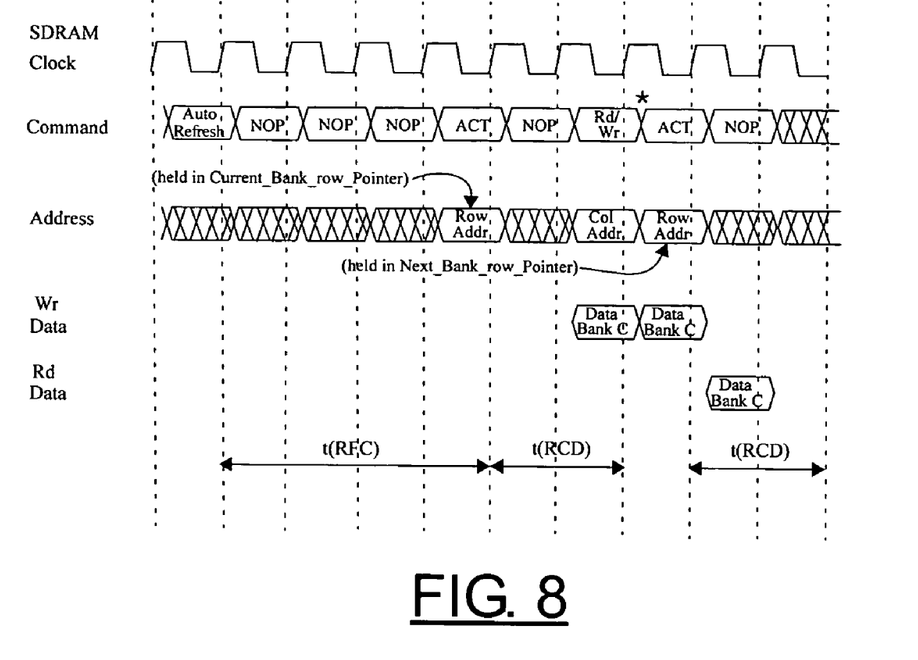
FIG. 8 is a diagram illustrating a first timing diagram of a row access using a next bank row pointer.
Figure 9:
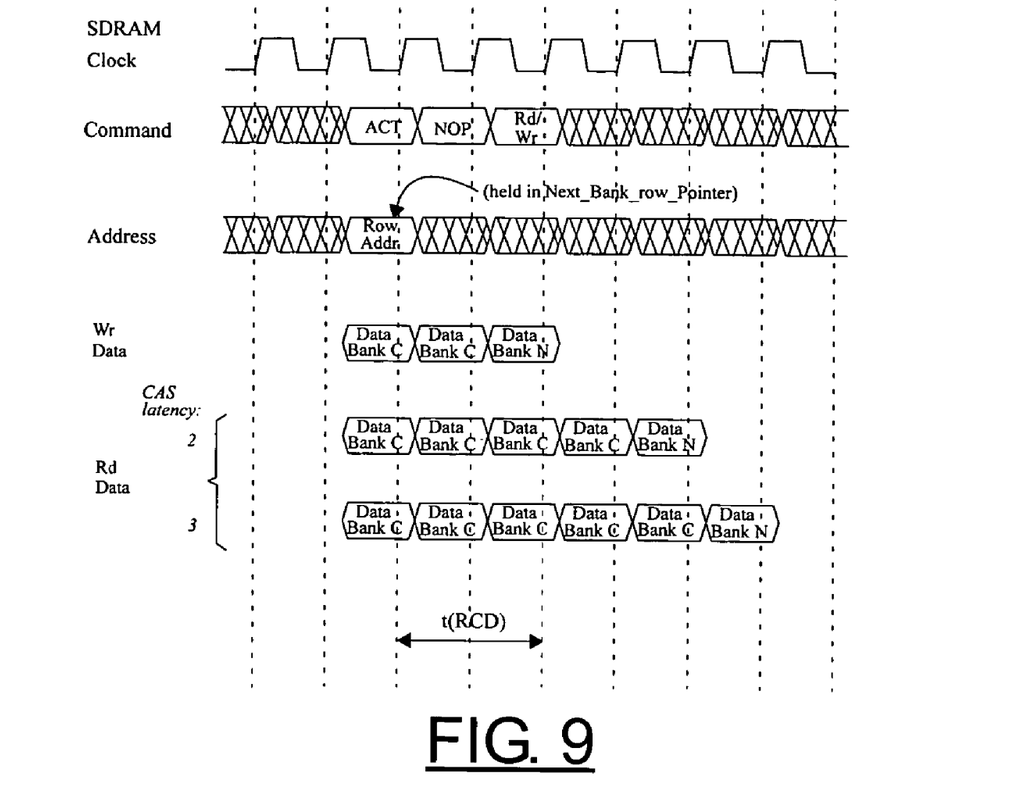
FIG. 9 is a diagram illustrating a second timing diagram of a row access using a next bank row pointer.

Referring to FIG. 7, a diagram illustrating the timing of a row access using a current bank row pointer is shown. Referring to FIG. 8, a diagram illustrating a first timing diagram of a row access using a next bank row pointer is shown. The commands NOPs may come before the commands ACT at *, if the second data does not follow immediately after the first data for a write operation or if the CAS latency is greater than 2 for a read operation. Referring to FIG. 9, a diagram illustrating a second timing diagram of a row access using a next bank row pointer is shown.

The filling and draining is normally made transparent. For write burst, a completion register bit in the block 150 is set by the host at end of a transfer session. The bit is cleared by the controller hardware once all new data are drained into the SDRAM 106 from FIFO 156, indicating readiness for a new session. Host software normally polls the bit until the clear state is read, ensuring the FIFO 156 is clean before a new session begins.

For read burst, the host normally writes to the memory pointers in a control/status register set 150 before configuring the counterpart registers in the DMA machine 134. An SDRAM read cycle is triggered as soon as a direction bit located in the register set 150 is written with the read direction. Enough time is normally provided to hide data pre-fetch to the read FIFO 156 during the DMA configuration period. By the time DMA starts the actual read, data are readily available from the filled FIFO 156. A completion register bit in the block 150 is set by the host at the end of a transfer session. The bit is cleared by the controller hardware once all data residual in the FIFO 156 are flushed, indicating readiness for a new session. Host software generally polls the bit until the clear state is read, ensuring a clean FIFO 156 before a new session begins.

The organization of the memory array 106, along with the clock rate of the SDRAM 106 are important design constraints. In particular, important parameters of the memory array 106 include (i) the number of columns per row, (ii) the number of rows per bank, and (iii) the total number of banks. A particular system configuration may vary with different parameters. The following definitions apply generally to the figures and description:

SDCLK=SDRAM clock
SDCLKPRD=1 SDRAM clock period=1/SDCLK
REFHCYCL=refresh cycle, typically 64 ms
DATAWIDTH=number of bytes per data word
NUMCOLPERBANK=number of columns per bank
NUMROWPERBANK=number of rows per bank
TOTALNUMBANK=total number of banks
REFHPRD=refresh period one-page-at-a-time=REFHCYCL/NUMROWPERBANK
REFHOVHD=refresh overhead The following equation EQ1 shows a typical equality:

(REFHPRD−REFHOVHD)<=((TOTALNUMBANK−1)*NUMCOLPERBANK*SDCLKPRD)

In general, the total time for accesses to all data in any adjacent rows in (TOTALNUMBANK−1) banks should be no less than (REFHPRD−REFHOVHD) to provide proper operation. Proper operation should result as long as (i) there is not a bank that is to be accessed between one of the other banks within two refreshes or (ii) there is not a bank that is to be accessed again having a burst in the bank that has been terminated. For instance, an example array may be composed of a total of 8 banks (e.g., #0, #1, #2, #3, #4, #5, #6, #7). After performing a refresh, there are only a handful of data left to be transferred in the current bank #3. The bank #4 is accessed shortly after all data in the bank #3 are transferred. Transfers go on through the banks #5 ... #2. In such an example, the next refresh should come before the bank #2 is completed. Otherwise, the bank #3 would be accessed again, which can cause data corruption. Therefore, the most data that can normally be transferred between two refreshes occurs when transfers (i) begin after the first refresh at the first column in a row of a certain bank n and (ii) end before the second refresh at the last column in next row number (e.g., the same row number if n equals 0) of the bank n−1 (where n−1 equals 7 if n equals 0 for an 8-bank array).

An example time line is illustrated in the following TABLE 1:

TABLE 1

| BANK0 | ... | BANK (TOTALNUMBANK−1) |
|---|---|---|
| <-REFHOVHD-> <-NUMCOLPERBANK*SDCLKPRD-> | ... | <-NUMCOLPERBANK*SDCLKPRD-> |
| <- - - - - - - - - - - - - - - - - - - - - - - - - - -REFHPRD- - - - - - - - - - - - - - - - - - - - - - - - - - - - - - - -> | | |

A guaranteed maximum sustained data burst rate, measured in bytes per second, is normally defined by the following equation EQ2:

[(REFHPRD−REFHOVHD)/SDCLKPRD]*[DATAWIDTH/REFHPRD]    (EQ2)

Challenging conditions may occur when one factor changes in a certain way and another factor needs to be scaled and compensated to maintain validity. For example, as the frequency of the SDRAM clock signal SDCLK increases, other factors need to compensate.

For example, a 54 Mhz clock signal may be a good choice for an SDRAM clock. If the SDRAM clock is 54 Mhz, then to satisfy equation EQ1, if TOTALNUMBANK=4, NUMCOLPERBANK=256, SDCLK=54 =>7.67 us<14.22 us. If the SDRAM clock is 108 Mhz, (EQ1) is not satisfied if TOTALNUMBANK=4, NUMCOLPERBANK=256, SDCLK=108=>7.66 us !<7.11 us, where TOTALNUMBANK, NUMCOLPERBANK, AND NUMROWPERBANK=8192 are common values of SDRAM semiconductor package available in the market. In one example, the number of clock periods satisfying t(WR), t(RP),t(RFC) and t(RCD) for 108 Mhz are 1, 3, 8, 3 respectively, thus translating to sixteen 108 Mhz clock cycles for the time REFHOVHD. As for 54 Mhz, the parameters are 0, 2, 4, 2 respectively, or nine 54 Mhz clock cycles for the blackout time.

The present invention may be particularly beneficial to non-PC embedded consumer applications, such as digital media recorder/player and set-top receiver boxes, etc.

A write generally refers to the transfer direction from the transferring master to the memory array 106, vice versa for read. The SDRAM array may receive a 54 Mhz clock signal. 54 Mhz is often an even multiple or divisor easily obtained from an embedded media system. The frequency is fast enough for many applications (e.g., compression-based media processing systems) while not being unnecessarily fast, thus saving power and silicon area. While a 54 Mhz clock signal has been mentioned for illustrative purposes, other clock frequencies may be used to meet the design criteria of a particular implementation.

The present invention may implement a precharge all-bank command to (i) terminate a full-page burst on the current row (the full-page may be the burst length type used) and (ii) precharge and close all banks, activated or not, in the memory array. Each precharge is normally followed by a refresh, one-page-at-a-time, every refresh period (e.g., 64 ms divided by total number of rows per bank). Therefore, the memory interface state machine 152 does not need to perform precharge until immediately prior to refresh. Precharged banks are being opened one by one as accesses progress to corresponding rows, leaving all banks activated until next refresh. Moreover, the present invention may use read/write commands to terminate all rows accessed prior to the current row.

The interface 104 normally maintains two bank/row pointers for use when row access Active command is issued. For example, the pointer CURRENT_BANK_ROW points to current bank with the row address for next data. The pointer NEXT_BANK_ROW points to the next bank with the same row number (or to first bank of the memory array with next row number if it is currently at last bank). FIG. 5 illustrates the addressing sequence for rows and the relationship between rows and banks.

In one example, let the signal NUMCLKACT be the ceiling function, ceil(t(RCD)/SDCLKPRD), for the next integer round-up of t(RCD) divided by one SDRAM clock period (e.g., the number of SDRAM clock cycles satisfying t (RCD)). The timing of the issuance of an active command presents the pointers.

For the pointer CURRENT_BANK_ROW, the timing may be presented to the SDRAM 106 immediately after a refresh is performed, if a DMA session is in progress (e.g., the next cycle of the SDRAM clock SDCLK after t(RFC) has elapsed).

For the pointer NEXT_BANK_ROW, the timing may be presented early after a read/write has been issued for the current bank access. For an SDR SDRAM, the pointer NEXT_BANK_ROW is presented at the same cycle of the clock signal SDCLK that second to next data is presented to SDRAM 106 on a write and one cycle of the clock signal SDCLK is presented prior to the next data being presented from SDRAM 106 on read.

The pointer NEXT_BANK_ROW is normally presented short before a read/write is issued for the next bank access. For an SDR SDRAM, the pointer NEXT_BANK_ROW is not presented until end of the current row is approached. Thereupon, the pointer NEXT_BANK_ROW is normally presented (i) as late as at the same cycle of the clock signal SDCLK that the (NUMCLKACT)th last data in the row is presented to SDRAM 106 on write and (ii) as late as one cycle of the clock signal SDCLK prior to that the (NUMCLKACT+cas latency-1)th last data in the row is presented from the SDRAM 106 on a read.

The pointer CURRENT_BANK_ROW is updated with the value in the pointer NEXT_BANK_ROW when the transferring master has made a data transaction while the pointer COLUMN_POINTER is pointing to the last column. At this same time, the pointer NEXT_BANK_ROW advances to the same row number in next bank or next row number in first bank if the pointer NEXT_BANK_ROW is currently pointing to the last bank of the memory array 106.

The entire space of the SDRAM 106 is normally indirectly mapped to a microprocessor host. The control/status register set 150 residing in the interface 104 may include an address register with a direction bit specifying a physical SDRAM address to be accessed, a data register, a pair of address registers specifying a physical SDRAM address range for DMA block accesses, and a transfer completion bit to signal at the end of a DMA session.

The host CPU 130 is to set up these control registers before those counterparts in the DMA transferring master. After a DMA master generates an interrupt signal to the host upon a block transfer completion, the host CPU 130 may terminate a transfer session by asserting the completion bit in the interface 104. The completion bit will be deasserted by the interface hardware once the interface has synchronized and returned to a transfer initial state.

Access cycles of the SDRAM 106 are triggered whenever (i) the host CPU 130 writes the address register 150 with the direction bit indicating a read transfer (e.g., an SDRAM read), (ii) a DMA master writes the data register (e.g., an SDRAM write) and (iii) a DMA master reads the data register (e.g., an SDRAM read).

No explicit burst termination or bank closing cycles are needed to operate in a SDRAM full-page burst mode (e.g., when meeting t (RAS) requirement). No explicit read/write incurred precharge commands are needed. A fill and drain time for a shallow FIFO 156 is normally completely hidden in interrupt based DMA transactions. The host CPU 130 is normally allowed to transfer data to contiguous addresses seamlessly, without access latency nor the need of hard flow control.

The present invention may provide a memory control scheme with a single state machine 152. The state machine 152 may provide (i) scheduled, evenly distributed refreshes, at a frequency reciprocal of REFRESH_PERIOD, (ii) interleaving bank access, (iii) execution of only one precharge command per REFRESH_PERIOD, and (iv) except for the first bank after a refresh, all row accesses (e.g., active command) to subsequent banks are hidden.

The present invention may provide scalability for various system configurations. A next bank is accessed or activated ahead of time before the column accesses in the current bank end. No bank other than the next bank is normally allowed to be pre-activated. The controller 104 may access a future row in next bank at various timings.

The present invention may provide control logic 152 that may activate a new bank and start a new burst on a new row as needed. Such activation may be provided without concern of burst termination, which is typically needed for full-page mode. The control logic 152 may only need to monitor for the periodic refresh, and execute a precharge command before a refresh command. A precharge is not normally needed before or after any row access on a per bank basis.

The present invention may be implemented without system latency to the host CPU 130 typically at the end of write transactions and at the beginning of read transactions otherwise. The host CPU 130 may transfer data to and from a memory array 106 regardless of the readiness of the memory array 106. A bus cycle may terminate at a convenient pace, as long as the minimum cycle time is given to maintain data throughput on the bus 108.

The present invention may maximize utilization of the bandwidth of interface 104. Clock speed and power may be minimized. A minimum amount of silicon area may be used for FIFO depth and control logic. Hardware real estate cost is minimized. The present invention may be suitable for various applications having the appropriate memory architecture and clock speeds meeting the criteria described. Data transfers may be sustained on every cycle of the SDRAM clock signal outside the periodic refresh time with use of only two bank pointers. Fast-paging secondary storage may be implemented to support local memory of a processor. Special purpose FIFO memories may be replaced by low-cost, high-density SDRAMs as multi-sector, single-port ring buffer.

To minimize the DMA overhead, all transfer sessions may be in plurality of 1 KB blocks (or other sizes according to chosen memory architecture) or cached in such blocks in processor's local memory. The present invention may be especially advantageous for media content data payload framed in blocks or program data with some degree of spatial locality.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a processor (i) configured to operate at a first data rate in response to a first clock signal and (ii) having a first bus interface unit to communicate on a system bus;
an interface circuit having (A) a state machine, (B) a second bus interface unit to communicate on said system bus and (C) a control status register having a completion bit that indicates in alternate states that (a) said processor is finished with a current transfer to said interface circuit and (b) said interface circuit is ready to begin a new read/write operation, said interface circuit being configured to (i) operate at a second data rate in response to a second clock signal and (ii) convert data received from said processor over said system bus from said first data rate to said second data rate; and
a first memory (i) having a plurality of banks, (ii) coupled to said interface circuit and (iii) configured to present/receive said data to/from said interface circuit at said second data rate, wherein said state machine is configured to precharge and close all of said banks prior to a refresh cycle being performed.

2. The apparatus according to claim 1, wherein said first clock signal and said second clock signal are independently generated.

3. The apparatus according to claim 1, wherein said second clock signal is generated in response to said first clock signal.

4. The apparatus according to claim 1, wherein state machine is configured to control the conversion between said first data rate and said second data rate.

5. The apparatus according to claim 1, wherein said apparatus provides paging to said first memory.

6. The apparatus according to claim 1, wherein said processor comprises (i) a central processing unit (CPU) and a memory control unit that communicates with a second memory.

7. The apparatus according to claim 1, wherein said interface circuit further comprises a bi-directional first-in-first-out buffer configured to transfer said data between said second bus interface unit and said state machine.

8. The apparatus according to claim 1, wherein said interface circuit is configured to minimize access requests to said first memory.

9. The apparatus according to claim 1, wherein said processor includes a direct memory access engine and said apparatus provides a delay when said direct memory access engine is not ready to present/receive said data to/from said first memory during a read/write operation.

10. The apparatus according to claim 9, wherein said apparatus is ready to begin said new read/write operation to/from said first memory when said completion bit is cleared.

11. The apparatus according to claim 1, further comprising a direct memory access engine having an upper bound register that is set in response to said completion bit being cleared.

12. The apparatus according to claim 11, wherein said direct memory access engine is configured to perform (i) a write operation when a lower bound register is clear and (ii) a read operation when said lower bound register is set.

13. The apparatus according to claim 12, wherein said direct memory access engine is configured to present an interrupt signal to said processor in response to completing a block of transfer during the read/write operation.

14. The apparatus according to claim 13, wherein said processor is configured to determine if more blocks are needed to be transferred during the read/write operation.

15. The apparatus according to claim 14, wherein said completion bit is set if there are no more blocks needed to be transferred during the read/write operation.

16. The apparatus according to claim 1, wherein said control status register includes a direction bit configured to indicate (i) a write operation when said direction bit is clear and (ii) a read operation when said direction bit is set.

17. An apparatus comprising:
processor means for (i) operating at a first data rate in response to a first clock signal and (ii) having a first bus interface unit to communicate on a system bus;
interface means having (A) a state machine, (B) a second bus interface unit to communicate on said system bus and (C) a control status register having a completion bit that indicates in alternate states that (a) said processor means is finished with a current transfer to said interface means and (b) said interface means is ready to begin a new read/write operation, said interface means configured for (i) operating at a second data rate in response to a second clock signal, and (ii) converting data received from said processor means over said system bus from said first data rate to said second data rate; and
memory means (i) having a plurality of banks, (ii) coupled to said interface means and (iii) presenting said data to/from said interface means at said second data rate, wherein said state machine is configured to precharge and close all of said plurality of banks prior to a refresh cycle being performed.

18. The apparatus according to claim 17, wherein (A) said processor means includes a direct memory access engine and said apparatus provides a delay when said direct memory access engine is not ready to present/receive said data to/from said memory means during a read/write operation, (B) said apparatus is ready to begin said new read/write operation to/from said memory means when said completion bit is cleared and (D) a direct memory access upper bound register is set in response to said completion bit being cleared.

19. A method for paging to a memory comprising the steps of:
(A) operating a processor at a first data rate in response to a first clock signal, said processor communicating on a system bus through a first bus interface unit;
(B) operating an interface circuit at a second data rate in response to a second clock signal, said interface circuit communicating on said system bus through a second bus interface unit and said interface circuit comprising a control status register having a completion bit that indicates in alternate states that (i) said processor is finished with a current transfer to said interface circuit and (ii) said interface circuit is ready to begin a new read/write operation;
(C) converting data received from said processor over said system bus from said first data rate to said second data rate in said interface circuit;

(D) operating said memory (i) having a plurality of banks, (ii) coupled to said interface circuit and (iii) presenting/receiving said data to/from said interface circuit at said second data rate; and (E) precharging and closing all of said plurality of banks prior to a refresh cycle being performed.

20. The method according to claim 19, wherein (A) said processor includes a direct memory access engine and said method provides a delay when said direct memory access engine is not ready to present/receive said data to/from said memory during a read/write operation, (B) said method is ready to begin said new read/write operation to/from said memory when said completion bit is cleared and (D) a direct memory access upper bound register is set in response to said completion bit being cleared.

21. An apparatus comprising:

a processor (i) configured to operate at a first data rate in response to a first clock signal and (ii) having a first bus interface unit to communicate on a system bus;

an interface circuit having (A) a state machine and (B) a second bus interface unit to communicate on said system bus, said interface circuit being configured to (i) operate at a second data rate in response to a second clock signal and (ii) convert data received from said processor over said system bus from said first data rate to said second data rate; and a first memory (i) having a plurality of banks, (ii) coupled to said interface circuit and (iii) configured to present/receive said data to/from said interface circuit at said second data rate, wherein said state machine is configured to precharge and close all of said banks prior to a refresh cycle being performed, wherein (A) said processor includes a direct memory access engine and said apparatus provides a delay when said direct memory access engine is not ready to present/receive said data to/from said first memory during a read/write operation, (B) said interface circuit comprises a control status register having a completion bit which indicates that said apparatus is ready to begin a new read/write operation, (C) said apparatus is ready to begin said new read/write operation to/from said first memory when said completion bit is cleared and (D) a direct memory access upper bound register is set in response to said completion bit being cleared.

* * * * *